United States Patent [19]

Bowra

[11] 4,119,165

[45] Oct. 10, 1978

[54] ARTICULATED VEHICLES

[75] Inventor: Cyril Embley Bowra, Bayswater, Australia

[73] Assignee: B.H.B. Engineers Pty. Ltd., Bayswater, Australia

[21] Appl. No.: 788,323

[22] Filed: Apr. 18, 1977

[30] Foreign Application Priority Data

May 20, 1976 [AU] Australia .................. PC5995

[51] Int. Cl.² .................................. B62D 53/02
[52] U.S. Cl. .................... 180/14 A; 212/38; 280/492
[58] Field of Search ............ 280/492, 402, 481, 418, 280/400; 180/14 A, 12, 52; 212/38

[56] References Cited

U.S. PATENT DOCUMENTS

| 2,440,550 | 4/1948 | Martin | 280/755 |
| 2,962,300 | 11/1960 | Garman | 280/418 A |
| 3,061,029 | 10/1962 | Pryor | 180/14 A |
| 3,123,222 | 3/1964 | Livingston | 212/38 |
| 3,179,440 | 4/1965 | Bumby | 280/492 |

FOREIGN PATENT DOCUMENTS 983,919  2/1965  United Kingdom ............ 280/402

Primary Examiner—John A. Pekar
Attorney, Agent, or Firm—Harness, Dickey & Pierce

[57] ABSTRACT

An articulated vehicle as herein described wherein the articulated structure between the portions comprises a support frame pivotally mounted at a number of spaced locations in the first portion to be pivotable about an axis parallel to and vertically in line with the longitudinal central axis of the first portion, the second portion of the vehicle being mounted to the support frame to be rotatable thereon about a substantially vertical axis.

3 Claims, 3 Drawing Figures

ARTICULATED VEHICLES

This invention is directed to articulated vehicles.

In particular the invention is directed to an articulated vehicle of the form having a first portion housing the engine, the driven wheels, the power transmission system between the engine and the wheels and a second portion providing a load supporting portion, and where the first portion utilises the castings of the engine and power transmission as means to provide the structural support normally provided by the chassis. Throughout this specification the term "articulated vehicles as hereinbefore described" shall relate to above form of articulated vehicle.

It is an object of the invention to reduce the stresses on the cast structures of the first portion of articulated vehicles as hereinbefore described.

In one form the invention resides in an articulated vehicle as herein described wherein the articulated structure between the portions comprises a support frame pivotally mounted at a number of spaced locations on the first portion to be pivotable about an axis parallel to and vertically in line with the longitudinal central axis of the first portion, the second portion of the vehicle being mounted to the support frame to be rotatable thereon about a substantially vertical axis.

Figure 1:
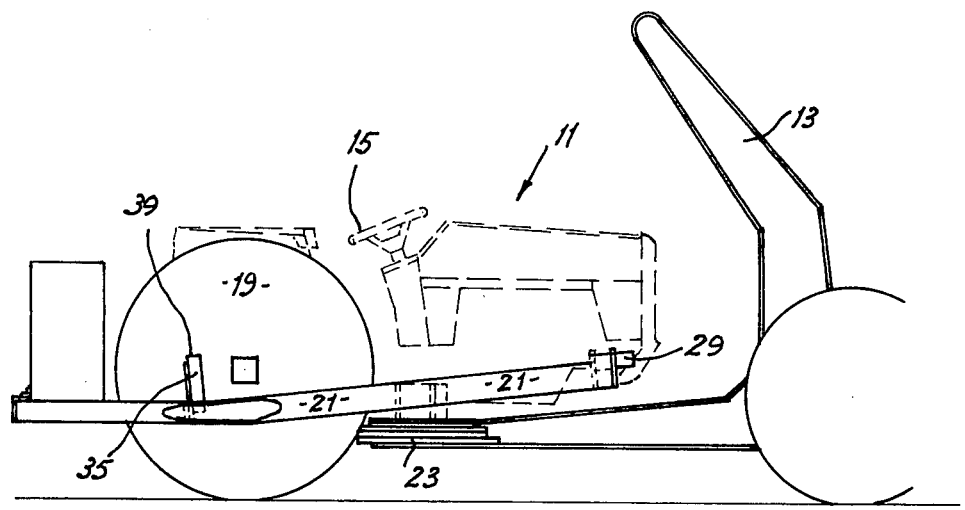
Figure 2:
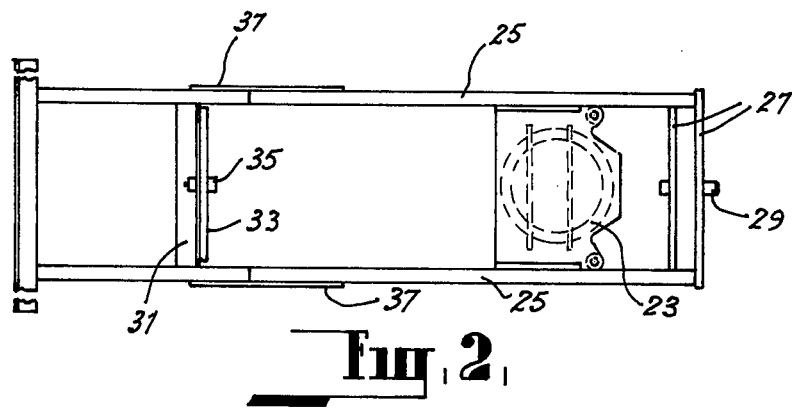
Figure 3:
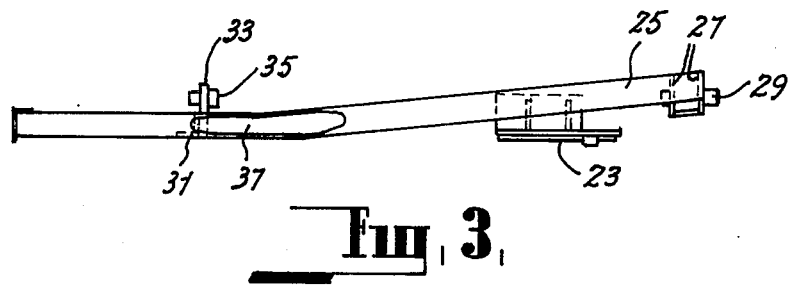

The invention will be more fully understood in the light of the following description of one specific embodiment. The description is made with reference to the accompanying drawings of which:

FIG. 1 is a part sectional view of an articulated crane according to the embodiment, FIG. 2 is a plan view of the support frame between the two portions of the crane, and FIG. 3 is an elevational view of the sub frame of FIG. 2.

The embodiment shown in the drawings comprises an articulated crane having a driven rear portion 11 and a forward load supporting portion 13 with a crane boom (not shown) mounted to it. The rear portion incorporates a driving station 15, the engine 17, a pair of driven wheels 19 and the power transmission system between the engine 17 and wheels 19. The rear portion is of a form where the castings for the engine 17 and power transmission system serve the function normally required of a separate chassis.

The forward portion 13 is mounted to the rear portion 11 via a support frame 21 through a turn table interconnection 23. The support frame 21 is shown in more detail at FIGS. 2 and 3. The support frame 21 comprises a pair of parallel spaced beams 25 transversly interconnected at one end by an angle and at the other end by a pair of transverse braces 27 which in turn support a centrally located pivot pin bearing 29. One portion of the turn table interconnection 23 for the two vehicle portions 11 and 13 is housed between the beams at an intermediate position between the ends of the beams 23. A transverse intermediate brace 31 is located between the beams 25 on the opposite side of the turn table connection 23 to the end transverse braces 27. The intermediate brace 31 receives a plate 33 which supports a central pivot bearing 35, the central axis of which is in line with the central axis of the pivot pin bearing 29. The pivot bearing 35 comprises a roller bearing supported on a shaft which is received in the plate 33. The beams 25 are bent in order to conform to the general configuration of the first portion 11 and such is achieved by the cutting of the beam and welding to form the bend. In order to reinforce such locations a reinforcing plate 37 is welded to each beam 25 adjacent the weld.

The support frame 21 is mounted to the first portion 11 of the vehicle such that the pivot pin bearing 29 is engaged by a pivot pin supported at the forward end of the first portion and such that its longitudinal axis is parallel to and vertically in alignment with the central longitudinal axis of the first portion. The pivot roller bearing 35 is received in a recess in a support plate 39 mounted to the rear of the axle housing of the driven wheels 19. The rear end of the support frame carries a counterweight 41.

As a result of the support frame 21 the first portion is pivotally supported about a centrally disposed longitudinal axis at two spaced locations. Any stresses between the two portions 11 and 13 produced by the loading on the second portion is borne totally by the support frame 21 and are not transmitted to the castings of the first portion. In addition the pivotal mounting between the first portion and support frame permits relative horizontal rotation between the two portions 11 and 13 without placing stress on either portion.

I claim:

1. An articulated vehicle comprising a prime mover portion and a wheeled load supporting portion interconnected by an articulated structure, said prime mover portion being provided with a power source, driven wheels and a power transmission for transmitting drive between said power source and said wheels, said prime mover portion further including a cast structure for providing chassis support for said power source and said power transmission, said articulated structure comprising an elongated frame positioned beneath said prime mover portion and a turntable carried by said frame, said turntable being journalled to said load supporting portion for permitting relative rotation between said prime mover portion and said load supporting portion about a substantially vertical axis, said frame having spaced bearing means defining a pivot axis parallel to and vertically in line with a longitudinal central axis of said prime mover portion, said cast structure being journalled adjacent its front and rear end portions in said spaced bearing means for pivotal movement of said prime mover portion upon said frame about said axis for isolating stresses of said load supporting portion from said prime mover portion.

2. An articulated vehicle as claimed at claim 1 wherein the prime mover portion is supported on a single pair of driven wheels and the wheeled load supporting member is supported on a single pair of wheels.

3. An articulated vehicle as claimed at claim 2 wherein the wheeled load supporting portion comprises a crane boom mounted to a wheeled support frame.

* * * * *